United States Patent
Haskins

(10) Patent No.: US 10,932,622 B2
(45) Date of Patent: Mar. 2, 2021

(54) GRINDER FOR A MASON JAR

(71) Applicant: Jesse James Haskins, Wakefield, RI (US)

(72) Inventor: Jesse James Haskins, Wakefield, RI (US)

( * ) Notice: Subject to any disclaimer, the term of this patent is extended or adjusted under 35 U.S.C. 154(b) by 243 days.

(21) Appl. No.: 15/923,652

(22) Filed: Mar. 16, 2018

(65) Prior Publication Data

US 2018/0271327 A1 Sep. 27, 2018

Related U.S. Application Data

(60) Provisional application No. 62/475,639, filed on Mar. 23, 2017.

(51) Int. Cl.
*A47J 42/14* (2006.01)
*A47J 42/40* (2006.01)
*A47J 42/24* (2006.01)

(52) U.S. Cl.
CPC ............... *A47J 42/14* (2013.01); *A47J 42/24* (2013.01); *A47J 42/40* (2013.01)

(58) Field of Classification Search
CPC .. A47J 42/14; A47J 42/20; A47J 42/04; A47J 42/24; A47J 42/34; A47J 42/16; A47J 42/06; A47J 42/26; A47J 42/36
See application file for complete search history.

(56) References Cited

U.S. PATENT DOCUMENTS

| | | | | |
|---|---|---|---|---|
| 137,462 | A * | 4/1873 | Mason | A47J 42/24 241/168 |
| 7,886,999 | B2 * | 2/2011 | Ruzycky | A47J 42/24 241/168 |
| 9,757,733 | B1 * | 9/2017 | Dukat | B02O 18/08 |

FOREIGN PATENT DOCUMENTS

| | | | | |
|---|---|---|---|---|
| GB | 2557950 A | * | 7/2018 | ............ A47J 42/34 |
| WO | WO-2004037057 A1 | * | 5/2004 | ............ A47J 42/04 |

OTHER PUBLICATIONS

Mason jar coffee grinder (website accessed Mar. 12, 2020) (https://www.amazon.com/The-Pens-and-More-Store/dp/B01GL8SS4O) (Year: 2016).*
DCOU grinder (URL included in file; first available on Amazon.com Nov. 26, 2015; website accessed Jul. 1, 2020) (Year: 2015).*

(Continued)

*Primary Examiner* — Shelley M Self
*Assistant Examiner* — Fred C Hammers
(74) *Attorney, Agent, or Firm* — Barlow, Josephs & Holmes, Ltd.

(57) ABSTRACT

The present disclosure provides systems and methods for grinding and storing, for example, herbs or spices. In particular, the grinding device of the present disclosure is preferably integrated directly with a mason jar. The grinder can generally include a bottom portion configured to be inserted into the threaded mouth of the mason jar and captured thereto with a common mason jar screw ring. The bottom portion can include a bowl with a plurality of teeth extending upward therefrom. The grinding device can additionally include a top portion with an annular wall extending from a disc portion and teeth extending from the bottom surface of the disc. The top portion can be sized and dimensioned to be received in and engage the bowl of the bottom portion. The user may twist the top portion freely in the bottom portion in order to grind materials therein.

12 Claims, 17 Drawing Sheets

(56) References Cited

OTHER PUBLICATIONS

Coffee4U (URL included in file; first available on Amaozon.com May 3, 2016; website accessed Jul. 1, 2020) (Year: 2016).*
Thomas Model 4 Wiley Mill—archive page (https://www.thomassci.com/Equipnnent/Mills/_/Thomas-Model-4-Wiley-Mill2; available since Apr. 30, 2016; website accessed Jun. 4, 2020) (Year: 2016).*

* cited by examiner

GRINDER FOR A MASON JAR

CROSS-REFERENCE TO RELATED APPLICATIONS

This application is related to and claims priority from the earlier filed provisional application Ser. No. 62/475,639, titled "GRINDER FOR A MASON JAR," filed on Mar. 23, 2017, all of which is herein incorporated by reference.

BACKGROUND OF THE INVENTION

The disclosure relates generally to tools for crushing and grinding items, such as plant, spice and herb products, and more particularly to a grinder that can be retrofitted to a mason jar or other container.

Grinders for materials plant materials, such as herbs, are known in the art. However, prior art grinders are inconveniently a separate device that a user must store and carry separately from a storage container for the herbs.

Therefore, there is a perceived need in the industry for a grinder that may be stored conveniently with and integrated to a storage container for the herbs themselves to save space and to allow for convenient transport for both the grinder and the storage container together.

SUMMARY OF THE INVENTION

The present disclosure solves the problems of the prior art by providing a grinder that may be easily attached to or integrated with a container, such as a mason jar. For ease of reference, the container will be referred to as a mason jar but such reference is not intended to limit the use of the present invention in any way. In particular, the grinding device of the present disclosure is preferably integrated directly with the mason jar. The grinding device may be provided as unit with a mason jar or may be offered (sold) separately to retrofit to existing mason jars. While the mason jar functions as a container for materials, such as herbs, that may be ground or have been ground previously, the grinding device enables the grinding of the herbs stored therein or stored separately. The grinder can generally include a bottom portion configured to be inserted into the threaded mouth of the mason jar and captured thereto with a common mason jar band. The bottom portion can thus serve as a sealing lid for the mason jar, keeping material stored therein fresh. The bottom portion can further include a bowl with a number of teeth extending upward therefrom. The grinding device can additionally include a top portion with an annular wall extending from a disc portion, thereby defining a top bowl, and teeth depending from the bottom of the disc. The top portion can be sized and dimensioned to be received in and engage the bowl of the bottom portion. The user may twist the top portion freely in the bottom portion in order to grind materials therein, as will be discussed in detail below.

BRIEF DESCRIPTION OF THE DRAWINGS

These and other features, aspects, and advantages of the present disclosure will become better understood with reference to the following description, appended claims, and accompanying drawings where:

DESCRIPTION OF THE INVENTION

Certain exemplary embodiments will now be described to provide an overall understanding of the principles of the structure, function, manufacture, and use of the device and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present disclosure. Further, in the present disclosure, like-numbered components of the embodiments generally have similar features, and thus within a particular embodiment each feature of each like-numbered component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape. Further, to the extent that directional terms like top, bottom, up, or down are used, they are not intended to limit the systems, devices, and methods disclosed herein. A person skilled in the art will recognize that these terms are merely relative to the system and device being discussed and are not universal.

Figure 1:
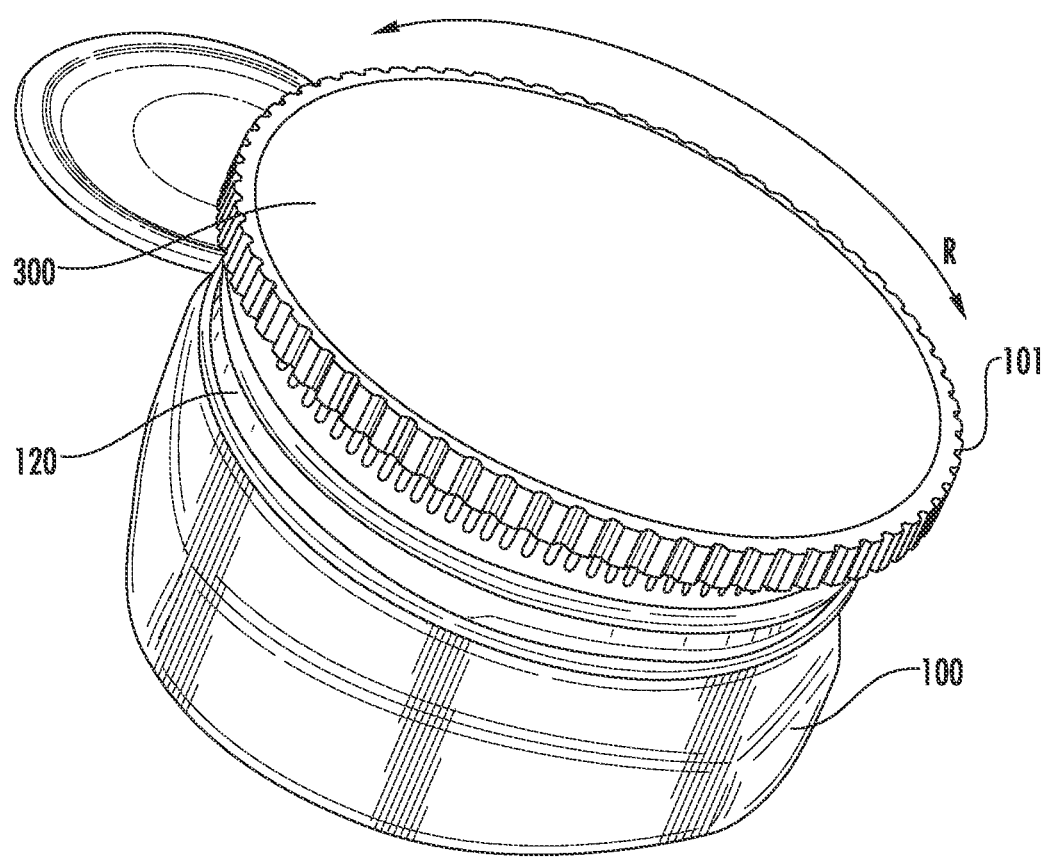
FIG. 1 is a perspective view of an exemplary grinder disposed in a jar.
Figure 2:
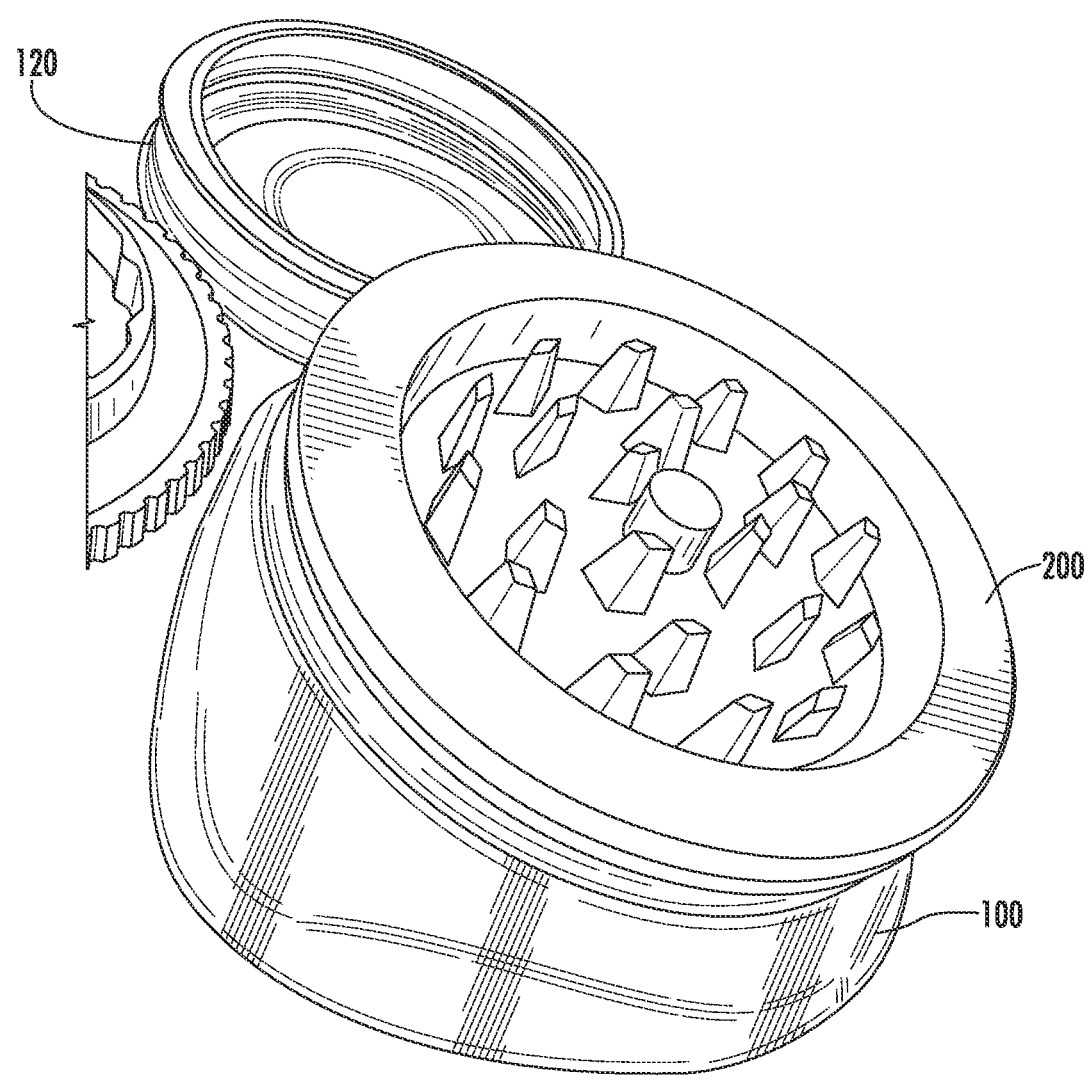
FIG. 2 is a perspective view of a bottom portion of a grinder disposed in a jar.
Figure 3:
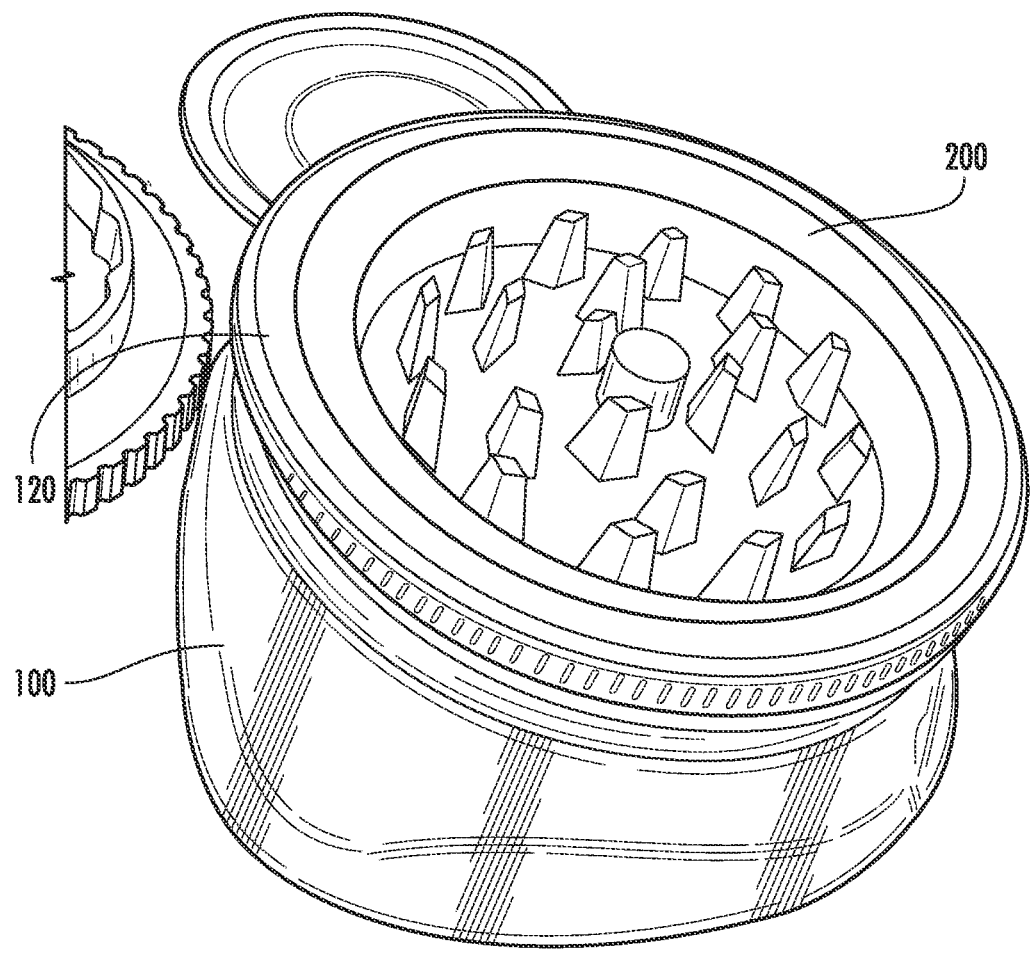
FIG. 3 is a perspective view of the bottom portion of FIG. 2 secured to the jar.
Figure 18:
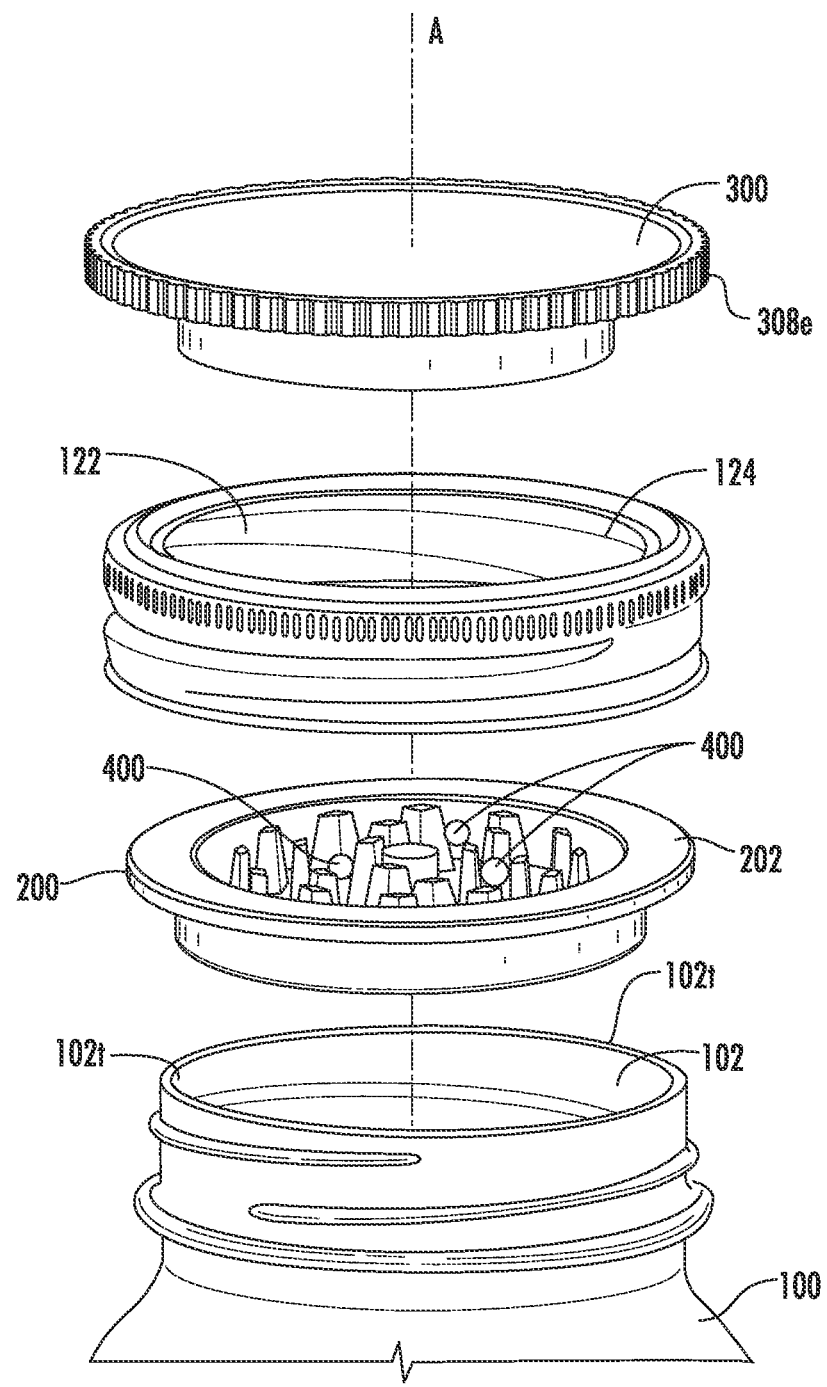
FIG. 18 is an exploded view the assembly of a grinder and jar.

Systems, devices, and methods for grinding, storing, and transporting materials within a modified, or retrofitted, container are disclosed herein. In general, as shown in FIG. 1, the system can include a container 100, for example a mason jar, having an opening, or mouth, at a top portion thereof, and a grinder 101 disposed in the mouth of the jar. The grinder 101 can, for example, include a bottom portion 200 and a top portion 300, as shown in FIGS. 1-3. The bottom portion 200 of the grinder 101 be secured to the jar 100 in place of a conventional disc-shaped lid 110 with a conventional, or modified, band screw ring 120, as discussed further below, as illustrated in FIG. 3. The top portion of the grinder 300 can be removably received by the bottom portion 200 to allow for a material 400 to be ground therein, as shown in FIG. 18 and discussed further below.

Figure 4:
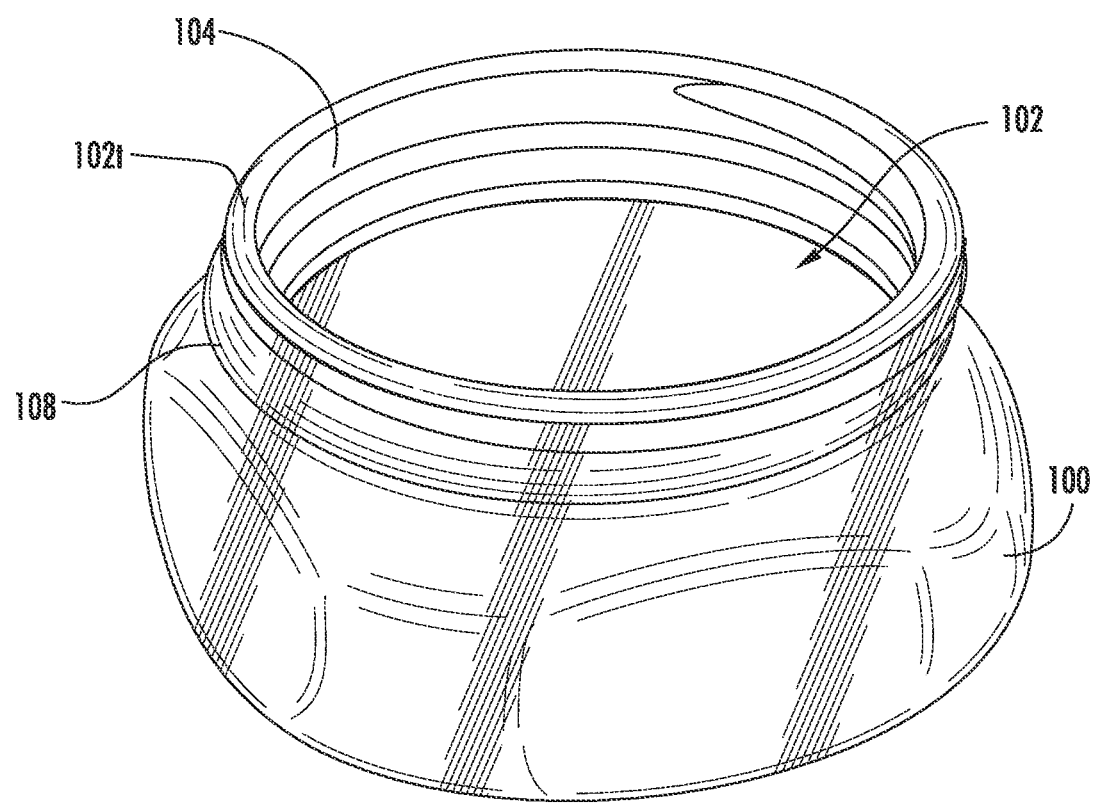
FIGS. 4-6 are perspective views of a prior art mason jar.
Figure 5:
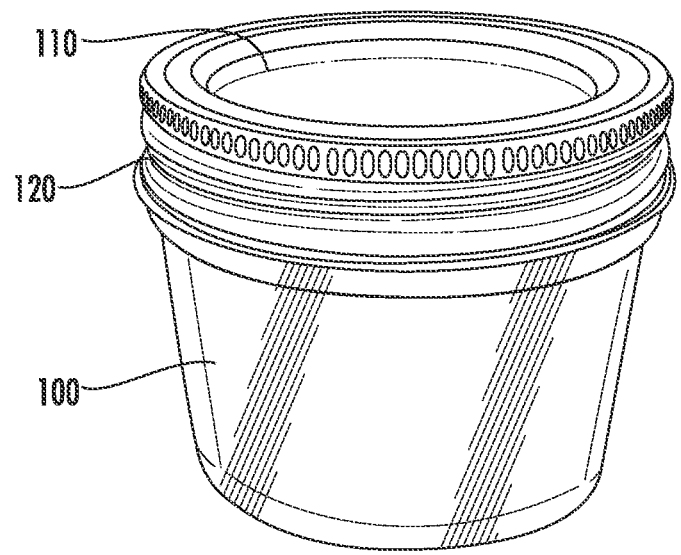
Figure 6:
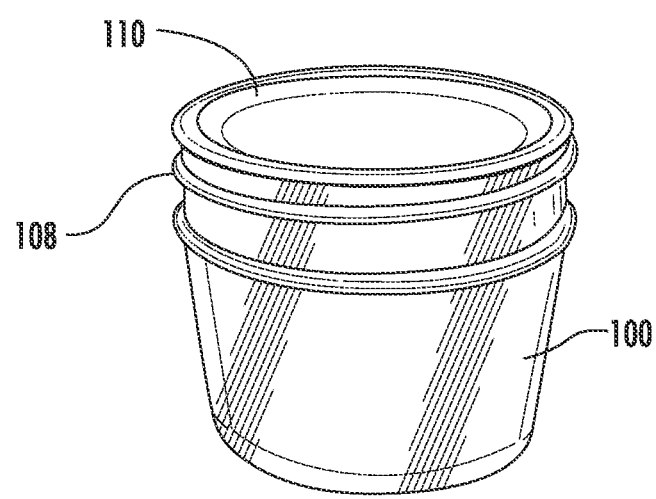
Figure 7:
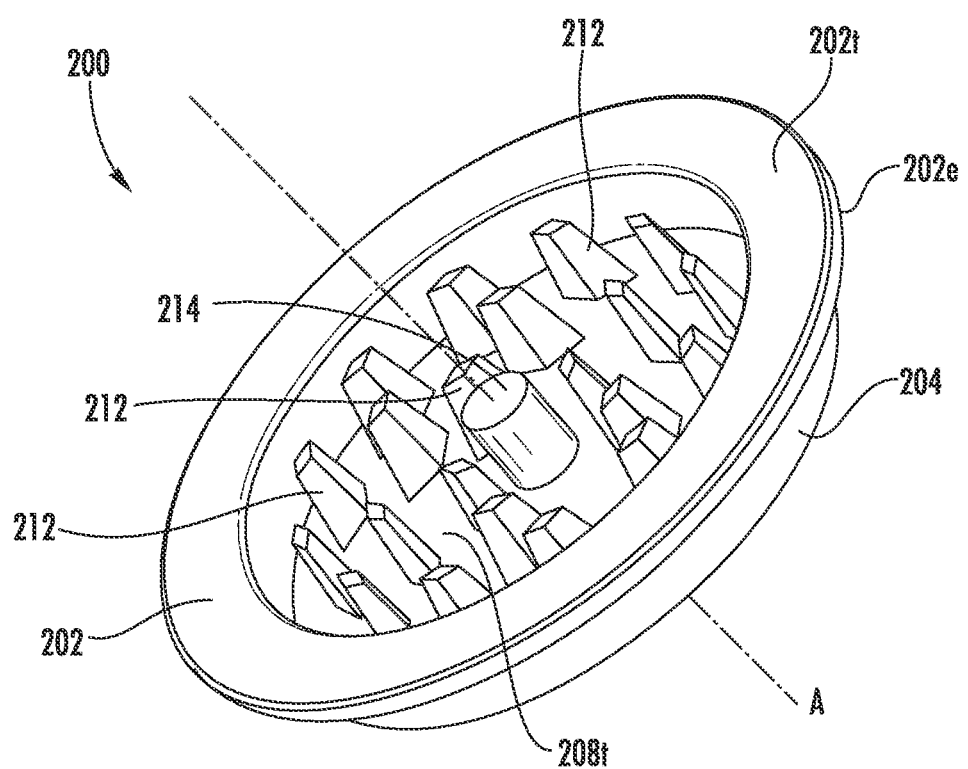
FIG. 7 is a perspective view of a first embodiment of the bottom portion of the grinder of FIG. 1.
Figure 8:
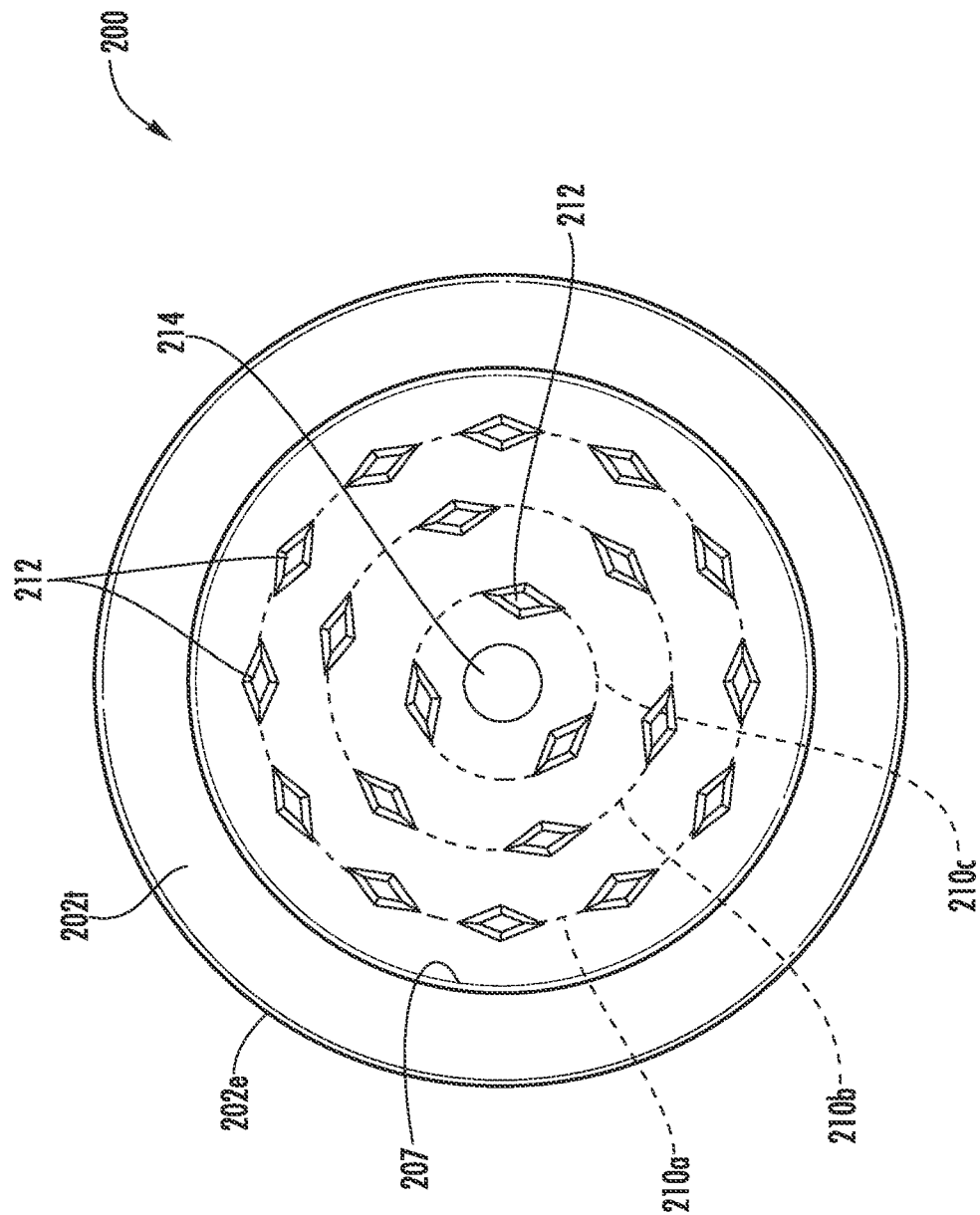
FIG. 8 is a top view of the bottom portion of FIG. 7.

While the grinder 101 of the present disclosure can be used with any number of different containers 100, in the illustrated embodiment, the grinder is shown interfacing with a mason jar. Mason jars 100 are well known molded glass jars often used in home canning, as shown in FIGS. 4-6. Other uses of mason jars 100 include storing herbs, spices, and other plants—some of which may require grinding before they can be used.

The body of the jar 100 has a threaded mouth, or opening, 102 at a top portion thereof. The opening 102 terminates at a top most edge 102t. In the illustrated embodiment the opening 102 has a generally cylindrical shape. The interior surface 104 of the opening 102 can be generally smooth. Threads 108 can be disposed on the outer surface 106 of the opening 102. In the United States, mason jars 100 come in standard mouth 102 sizes. A first size generally has a mouth 102 with a 2⅜ in (60 mm) inner diameter and 2¾ in (70 mm) outer diameter. A second "wide-mouth" size, not shown, which generally has a mouth with a 3 in (76 mm) inner diameter and a 3⅜ in (86 mm) outer diameter. The body of the jar can come in a variety of volumes, including, e.g., half-pint, quart, and half-gallon. In conventional use, a flat disc 110 is placed on the top rim 102t of the mason jar 100, as shown in FIG. 5. A band screw 120 can be threaded down onto the mouth of the jar. The band screw 120 can have an interior thread 124. In the illustrated embodiment, the disc 110 and the band screw 120 have a generally circular cross-sectional shape and are coaxially aligned with the jar 100 when fully installed. The threads 124 of the band screw 120 can engage the threads 108 of the jar to permit the band screw 120 to be threaded on to the jar 100 such that a compression fit is created between the bottom surface of the flat disc 110 and the top edge 102t of the jar—thereby sealing the jar 100.

It should further be understood that any type of container or jar, of any overall size, any mouth size, configuration or any type of lid or cover fastening system can employ the grinder of the present invention. The present invention can be modified, as needed, to suit the container at hand.

Figure 17:
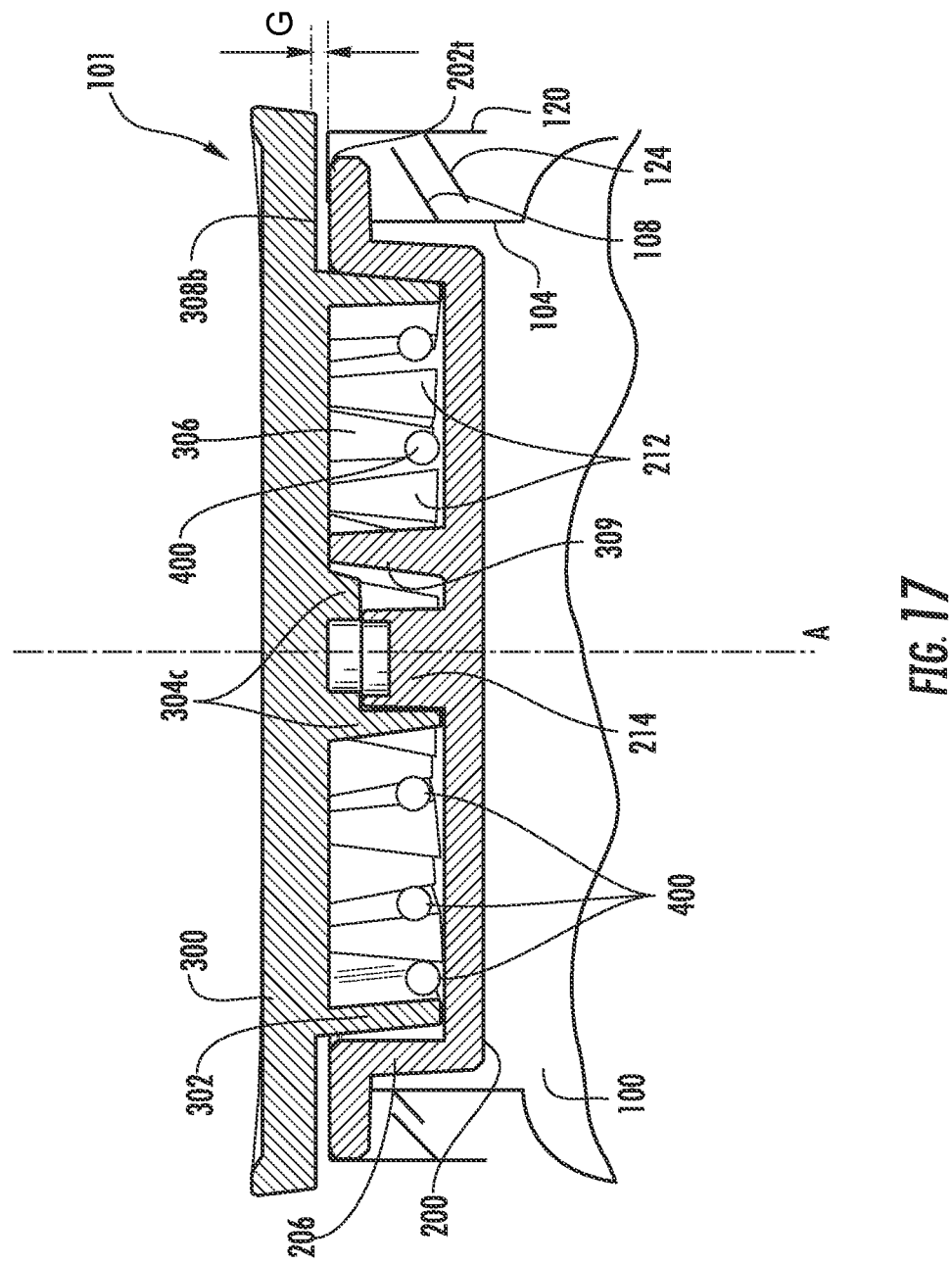
FIG. 17 is a cross sectional view of the assembly of a grinder and jar.

Referring to FIGS. 1 and 17, an embodiment of a grinder 101 for a jar 100 is shown generally. The illustrated grinder 101 includes a top portion 300 with a depending annular wall 302, bounding a number of teeth 306, 307, that is received into the bottom portion 200 having a bowl 204 with teeth 212 extending from a bottom surface 208. The top portion 300 may twist or rotate, in a direction R, inside the bottom portion 200 providing a grinding action with the teeth 212, 306 for grinding a material 400, such as herbs, spices, or other materials. As will be shown and described further below, the bottom portion 200 is sized and dimensioned to be received into the smooth inner diameter 104 of mouth 102 of a mason jar 100 and captured therein with a common mason jar band screw 120 in place of the conventional flat disc 110.

Figure 9:
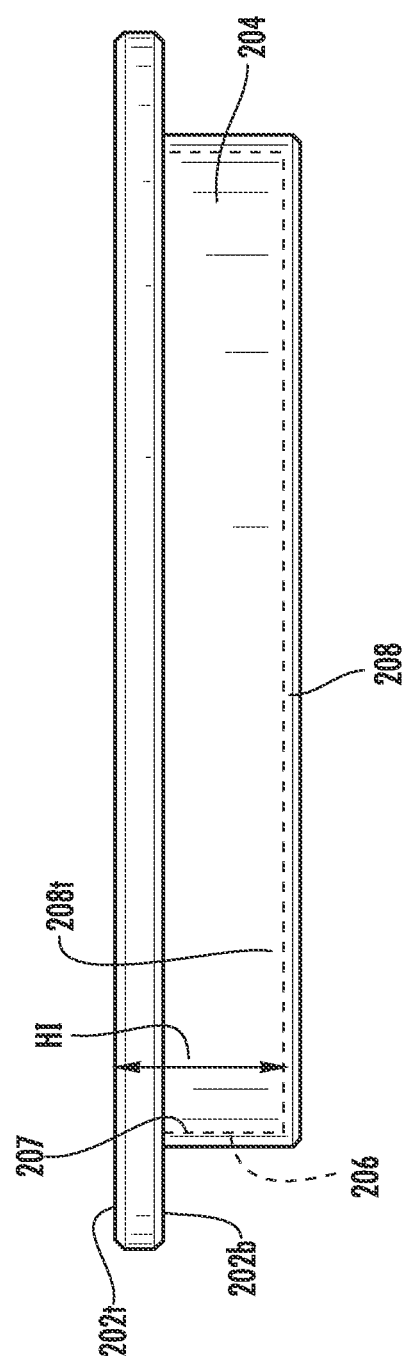
FIG. 9 is a side view of the bottom portion of FIG. 7.
Figure 10:
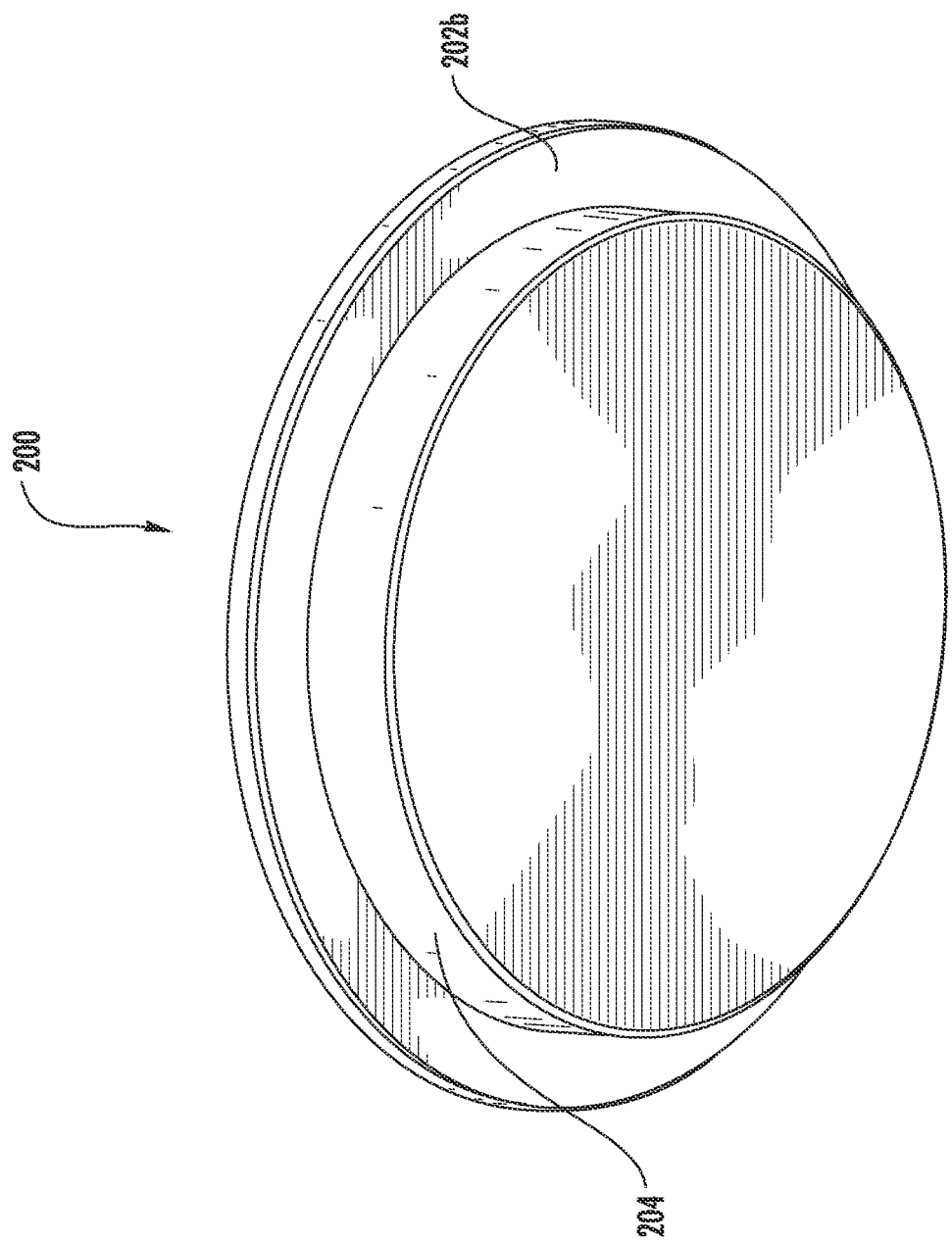
FIG. 10 is a bottom perspective view of the bottom portion of FIG. 7.

Referring to FIGS. 7-10, a first embodiment of a bottom portion 200 of the grinder 101 is shown generally. The bottom portion 200 can be manufactured from any number of different materials such as plastics or metals, or a combination of materials. The bottom portion 200 can have a generally circular cross-sectional shape. The bottom portion 200 can generally include an outer rim, or flange, 202 extending from a bowl 204. The outer rim 202 can have a diameter D1. In some embodiments, the diameter D1 of the outer rim 202 can be larger than the diameter of the threaded mouth 102 of the jar 100 so that the bottom surface 202b can rest on the top edge 102t of the jar. In the illustrated embodiment, the edge 202e of the outer rim 202 is shown as being smooth. In an alternative embodiment, the edge 202e of the outer rim 202 can be knurled or have a roughened texture. The bowl 204 of the bottom portion can include a wall 206 extending to a bottom disc 208, as seen in FIG. 9. The wall 206 and the bottom disc 208 can define a recessed area forming a circular, or cylindrical, bowl 204 having an internal height H1, shown in FIG. 9. The internal height H1 of the bowl 204 can extend from a top surface 202t of the outer rim 202 to a top face 208t of the bottom disc 208 of the bowl 204. The outer diameter D3 of the bowl 204 can be generally the same as the inner diameter of the mouth 102 mason jar 100 such that there is a frictional fit between the inner diameter of the jar 100 and the outer diameter D3 of the bowl 204. In illustrated embodiment, the outer diameter D3 of the bowl 204 can be less than the inner diameter of the mouth 102 of the mason jar 100, as seen in FIG. 17. The inner surface 207 of the wall 206 can have an inner diameter D5. In the illustrated embodiment, teeth 212 can extend upwardly from the top face 208t of the bowl 204. The teeth 212 can be arranged in a circular, coaxial, nesting pattern around a central guide post 214. The guide post can be a generally cylindrical shape, with a diameter D13, extending upward from the top surface 208t of the bottom disc 208.

Each of the rings of teeth 210a-c can respectively be disposed along a single diameter. For example, the bottom portion can include three circularly arranged rows, or rings, of teeth 210a-c each of which is concentric with the guide post 214. While three rings of teeth 210a-c are shown, any number of rings of teeth 212 can be used. The first, outer, ring of teeth 210a can have a first diameter D7, the second ring of teeth 210b can have a second diameter D9, and the third ring of teeth 210c can have a third diameter D11. In general, the diameters D7, D9, D11, can be sized such that D7>D9>D11. Further, the larger the diameter of the rings 210a-c, the more teeth 212 the respective ring can accommodate, though any number of teeth 212 can be used. In the illustrated embodiment the teeth 212 are in the shape of a truncated diamond pyramid, which have a diamond cross-sectional shape. In alternative embodiments the teeth 212 can have a number of alternative shapes including a truncated regular pyramid shape or a truncated cone shape. As will be discussed further below, the teeth 212 of the bottom portion 200 can interface with the teeth 306, 307 of the top portion 300 to grind materials 400.

Figure 11:
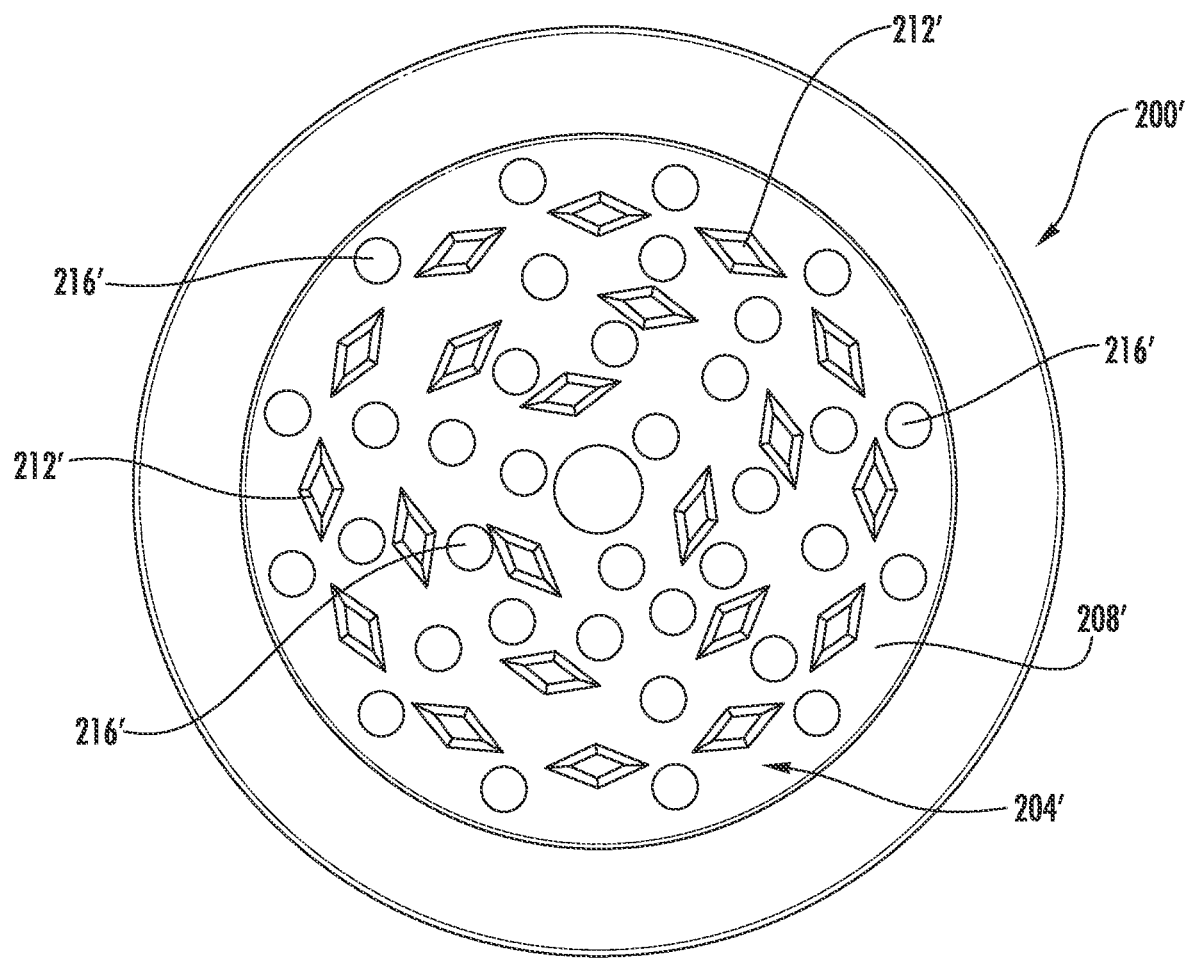
FIG. 11 is a top view of an alternative embodiment of a bottom portion.
Figure 12:
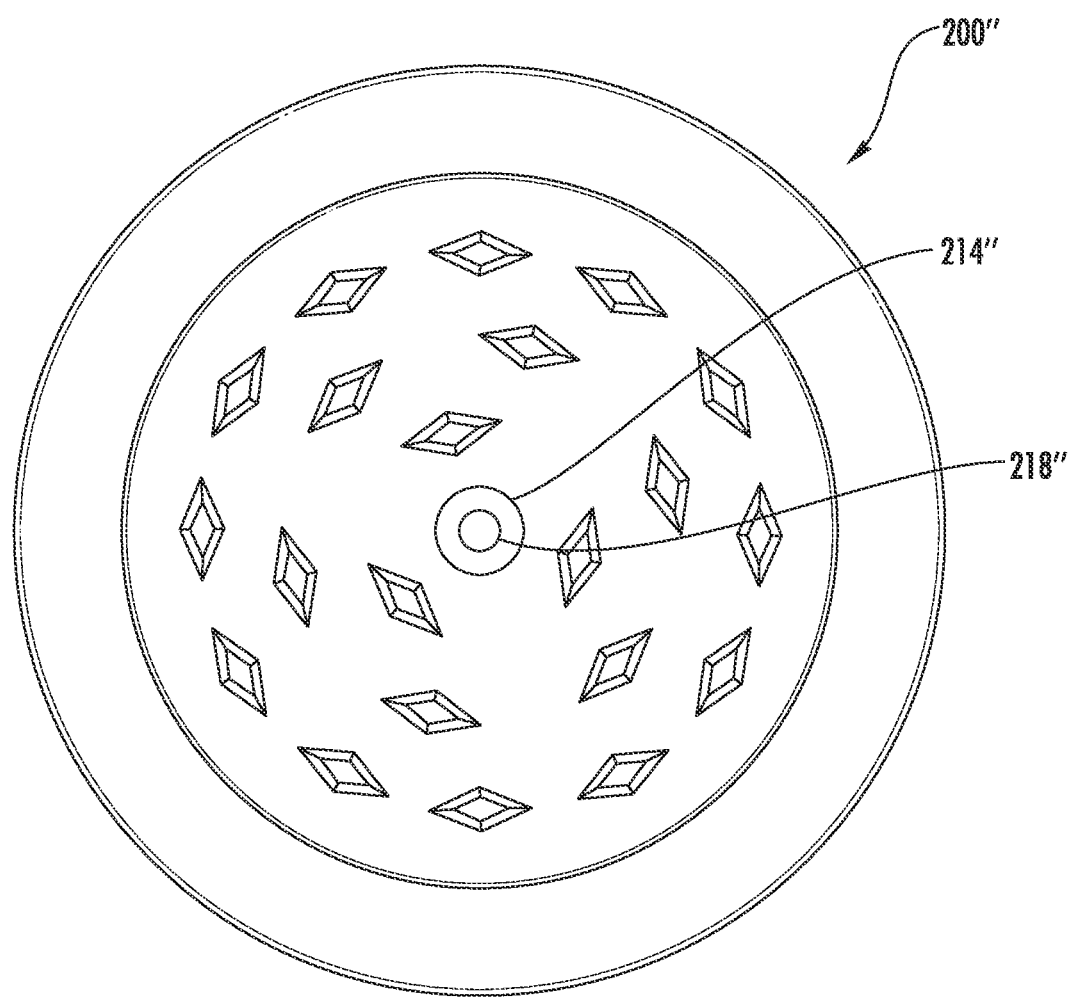
FIG. 12 is a top view of a further alternative embodiment of a bottom portion.

In an alternative embodiment of the bottom portion 200', as shown in FIG. 11, the bottom disc 208' can include a plurality of through holes 216'. These through holes 216' can be disposed through the bottom disc 208' in any arrangement such that they do not intersect with the teeth 212'. In one embodiment, the through holes 216' can function to allow for a portion of the ground material to fall through to a container below, such as the jar 100, and other portions of the material to remain in the bowl 204' of the bottom portion 204'. For example, the usable portions of the herbs may drop to the container while other portions can remain in the bowl 204' for easy disposal. In a further embodiment, as shown in FIG. 12, the guide post 214" of the bottom portion 200" can include a magnet 218" which can magnetically attract a corresponding magnet on the top portion 300, as will be discussed below. As will be appreciated by one of ordinary skill in the art, the plurality of embodiments of the bottom portions 200, 200', 200" can be combined in any combination. For example, the bottom portion of a grinder 101 can include both the through holes 216' and magnet 218".

Figure 13:
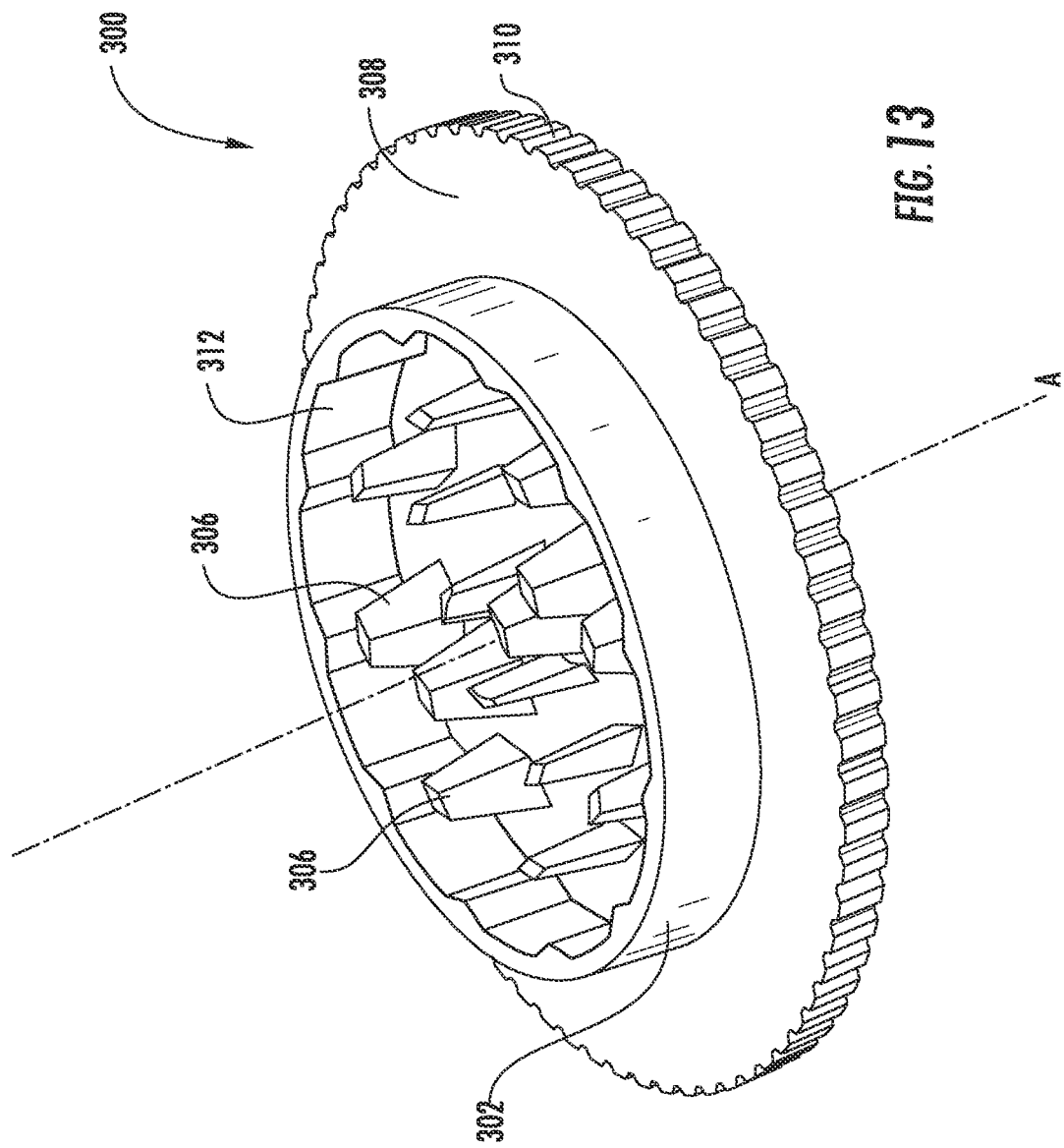
FIG. 13 is a bottom perspective view of a top portion of the grinder of FIG. 1.
Figure 14:
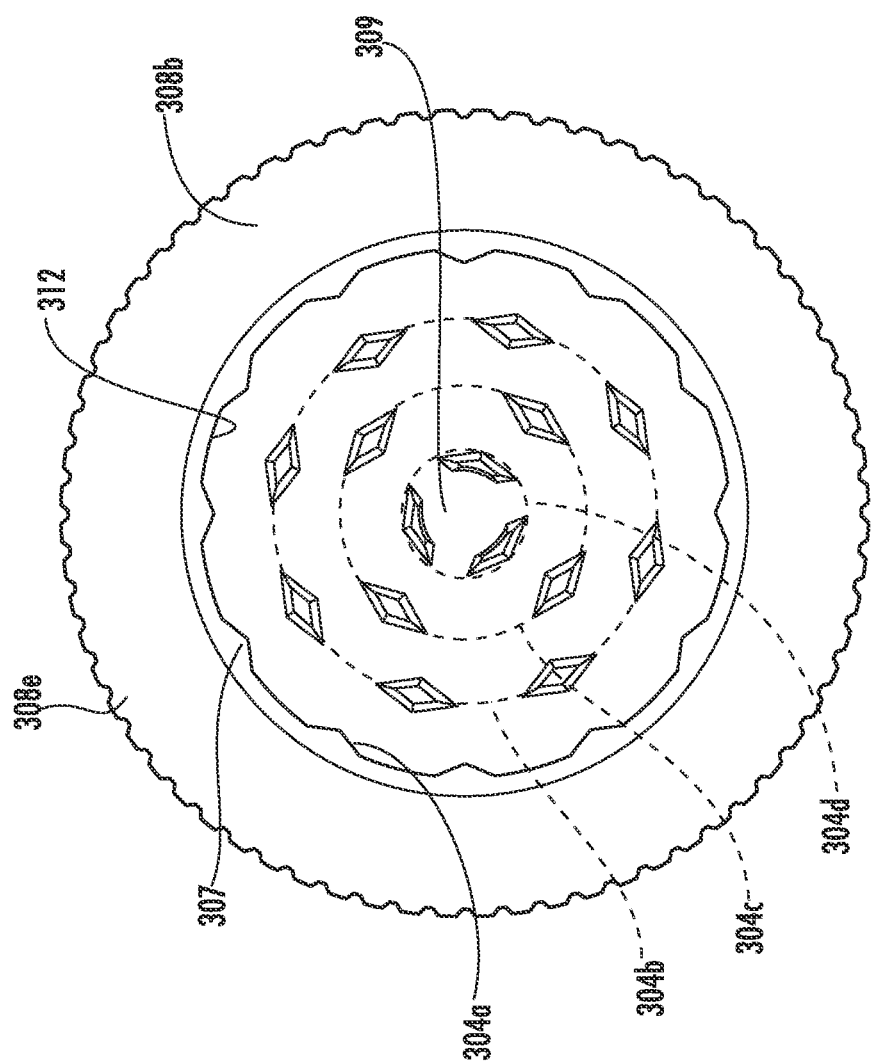
FIG. 14 is a bottom view of the top portion of FIG. 13.
Figure 15:
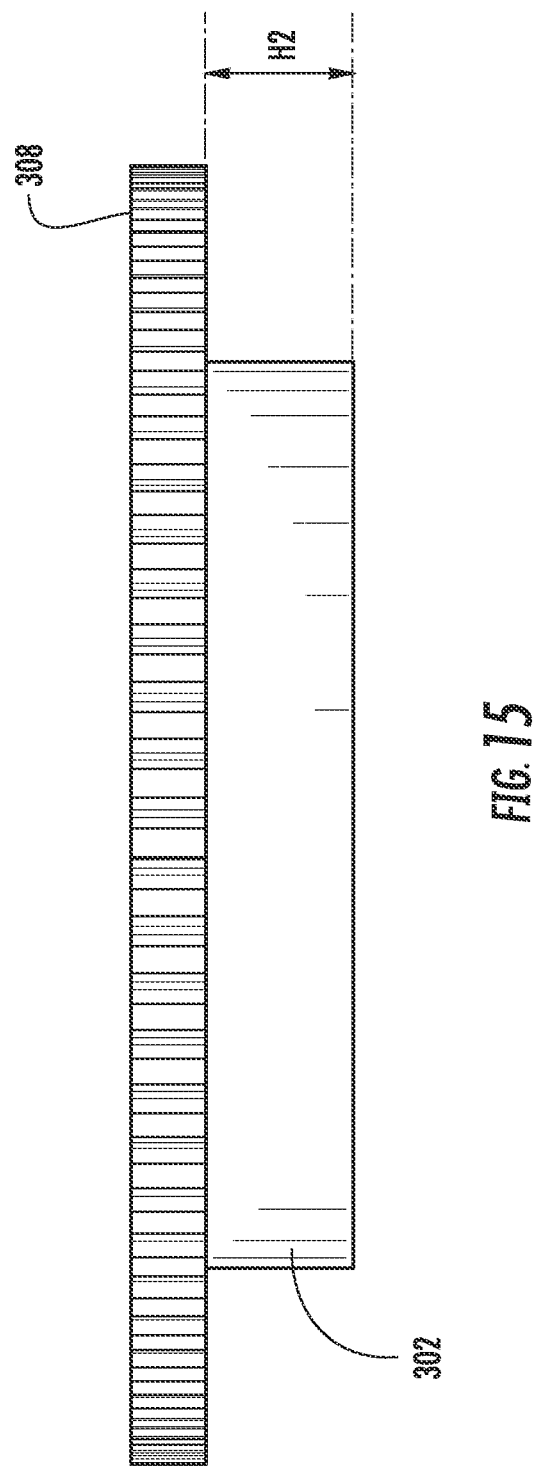
FIG. 15 is a side view of the top portion of FIG. 13.

Turning FIGS. 13-15, an embodiment of a top portion 300 of the grinder 101 is shown generally. The top portion 300 can be manufactured from any number of different materials such as plastics or metals, or a combination of materials. In some embodiments the top and the bottom portions 300, 200 are manufactured using the same materials, alternatively they can be different materials. The top portion 300 can include a top disc 308 and a downward extending annular wall 302. The top disc 308 can include an outer edge 308e having a diameter D2. The outer edge 308e may include ridges or knurling 310 to improve a user's grip. In an alternative embodiment, the outer edge 308e may be smooth. The annular wall 302 can extend downwardly from a bottom face 308b of the top disc 308. The annular wall 302 can have an exterior diameter D4, and a height H2, shown in FIG. 15. The exterior diameter D4 of the annular wall 302 can be smaller than the diameter D5 of the interior surface 207 of the wall 206 of the bottom portion 200 such that the annular wall 302 can be fit within the bowl 204 of the bottom portion 200.

A first ring of teeth 304a can extend radially inward from the inner surface 312 of the annular wall. The teeth 307 of the first ring of teeth 304a can be formed in the inner surface 312 of the annular wall 302 and can have a generally triangular cross-section that has a decreasing cross-sectional area the further the tooth 307 extends from the bottom surface 308b. In the illustrated embodiment, teeth 306 like those in the bottom portion 200, can extend downwardly from the bottom surface 308b of the top disc 308. The teeth 306 can be arranged in a circular, coaxial, nesting pattern around a central axis A. For example, the top portion 300 can include three circularly arranged rings of teeth 304b-d, each of which is concentric with the others and the first ring 304a. While four rings of teeth 304a-d are shown, any number of rings of teeth can be used. The first, outer, ring of teeth 304a can have a first diameter D6, the second row of teeth 304b can have a second diameter D8, the third row of teeth 304c can have a third diameter D10, and the fourth row of teeth 304d can have a fourth diameter D12. In general, the diameters D6, D8, D10, D12, can be sized such that D6>D8>D10>D12. Further, the larger the diameter of the ring 304a-d, the more teeth 306, 307 the respective ring can accommodate, though any number of teeth can be used. Of note, the diameters of the each of the rings of teeth, in the top and bottom portions, are not the same. This allows for the teeth to pass by, or between, the teeth of the other rings as the top portion 300 rotates relative to the bottom portion 200. In one embodiment, the rings of teeth 210a-c, 304a-d are dimensioned such that the top and bottom rings alternate as shown in FIG. 17. For example, the diameters D6>D7>D8>D9>D10>D11>D12. In alternative embodiments, the rings of teeth may not alternate from top to bottom.

In the illustrated embodiment, the teeth 306 of the two inner rings 304b, 304c are in the shape of a truncated diamond pyramid, which have a diamond cross-sectional shape. In alternative embodiments the teeth 306 can have a number of alternative shapes including a truncated regular pyramid shape or a truncated cone shape. However, the teeth of the inner ring 304d can have a circular cutout 309 on their respective interior, radially inward facing, walls. This circular cutout 309 can slidingly accommodate the guide post 214 of the bottom portion 200 to permit the user to guide, or receive, the bottom portion 200, as best seen in FIG. 17. Further, the guide post 214, when received within the inner ring of teeth 304d, can guide the rotation of the top portion relative to the bottom portion. In an alternative embodiment, shown in FIG. 16, the top portion 300' can include a magnet 318' disposed in the center of the disc 308'. The magnet 318' can magnetically attract the magnet 218" of the bottom portion 200" to retain the top portion and the bottom portion together.

Figure 16:
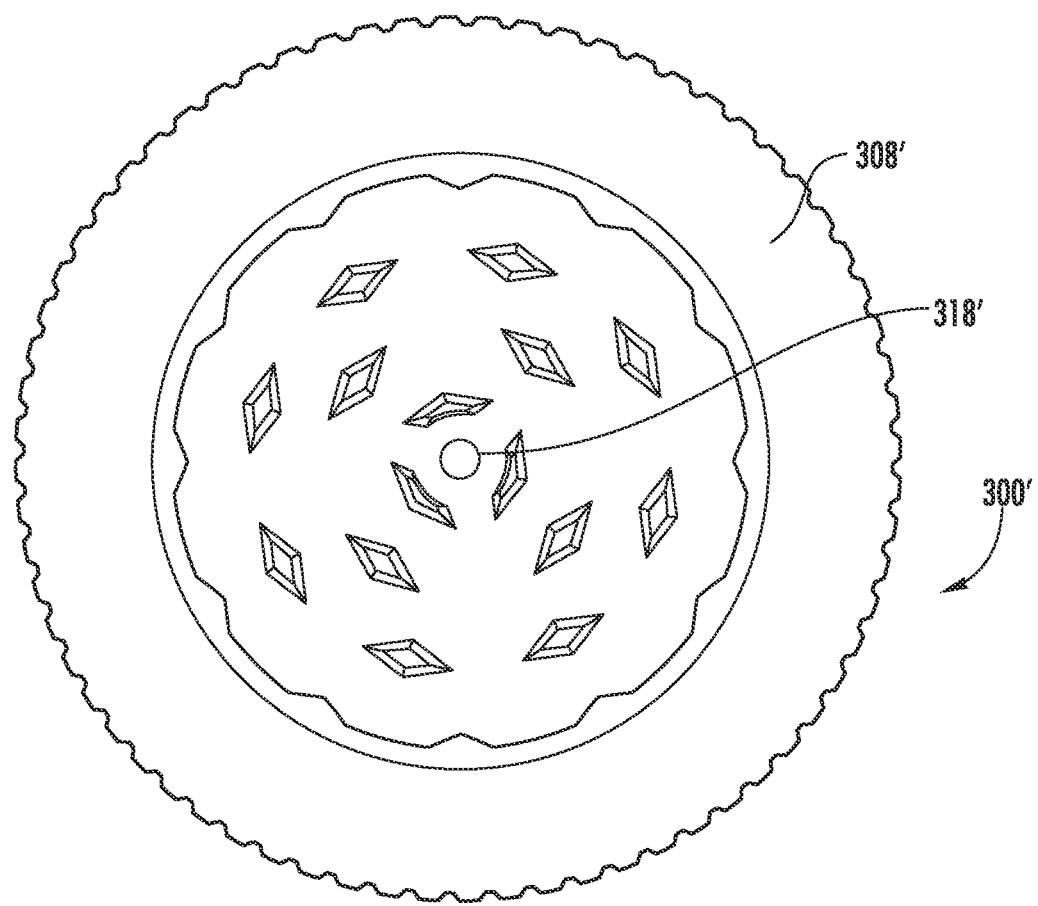
FIG. 16 is a bottom view of an alternative embodiment of a top portion.

As noted above, the grinder 101 is composed of a combination of the top portion 300 that is received in the bottom portion 200 as shown in FIGS. 17 and 18. The annular wall 302 of the top portion 300 can be received in the bowl 204 of the bottom portion 200. The guide post 214 of the bottom portion 200 can be received, to guide, the inner row of teeth 304d of the top portion 300. The top portion 300 can be inserted until a bottom facing surface 302b of the annular wall 302 makes contact with the top surface 208t of the bottom disc 208, as seen in FIG. 17. The internal height H1 of the bowl 204 is larger than the height H2 of the annular wall 302 such that a gap G is created between the bottom facing surface of the top rim 308b and the upward facing surface 202t of the bottom rim 202. The gap G can reduce the amount of sliding friction between the two parts 200, 300. In some embodiments, the outer diameter D4 of the annular wall 302 may be chosen such that a frictional fit is created between the outer surface of the annular wall and the inner wall of the bowl 206. The frictional fit can permit the two pieces to remain together during transport. Alternatively, or in addition, a magnet 218" can be disposed on the upper surface of the guide post 214, as shown in FIG. 12, and a second magnet 318' can be disposed on the bottom facing surface 308b in the center of the top portion 300, as shown in FIG. 16. The two magnets 218", 318' can be coaxially aligned. The two magnets 218" 318' can be arranged such that an attractive magnetic force is created between the two magnets 218", 318' to retain the top portion 300 relative to the bottom portion 200. The magnetic coupling can permit the top and bottom portions 300, 200 to freely rotate relative to each other. Once assembled together, the top portion 300 and the bottom portion 200 can be co-axially aligned.

In some embodiments, the grinder 101 can be used in combination with a container 100, such as a mason jar, as discussed above. In such a combination, the bottom portion 200 can be disposed within the mouth 102 of the jar 100 as shown in FIGS. 1-3 and 17, such that the bottom portion 200 is co-axially aligned with the longitudinal axis A of the jar 100. The bowl 204 of the bottom portion 200 can fit within the mouth 102 of the jar 100 such that the rim 202 of the bottom portion 200 rests on the top most surface 102t of the jar 100. In one exemplary embodiment, a screw ring 120 can be placed over the rim 202 and the mouth 102 of the jar to couple the bottom portion 200 to the jar 100, as best seen in FIGS. 3 and 17. The screw ring 120 can be tightened by engaging the outer threads 108 of the jar 100 with the threads 124 of the screw ring 120, such that the screw ring 120 advances downward towards the mouth 102 along the axis A. As the screw ring is advanced, the bottom surface of rim 202b of the bottom portion 200 can form a compression seal with the top surface 102t of the mouth 102 of the jar. The compression of the bottom portion 200 by the screw ring 120 and the mouth 102 of the jar 100 can prevent the bottom portion 200 from moving relative to the jar 100.

Once the bottom portion 200 is secured to the jar 100, the top portion 300 and bottom portion 200 can be co-axially joined together form the grinder 101 for a mason jar 100, as shown in FIGS. 1 and 17. The annular wall 302 of the top portion 300 is sized and dimensioned to be received into the bowl 204 of the bottom portion 200. The annular wall 302 of the top portion may contact the inner surface 206 of the wall 206 of the bowl 204 of the bottom portion 200. There may be a slight frictional fit so that the top portion 300 remains connected to the bottom portion 200 while still permitting the top portion to rotation relative the bottom portion for the grinding operation. A gap G may be formed between the bottom surface 308b of the top portion 300 and the rim 202 of the bottom portion 200, thereby reducing friction between the top portion 300 and bottom portion 200 when rotating.

In use, the top portion 300 is twisted/rotated clockwise and counter-clockwise on the bottom portion, as shown in FIG. 1. The knurled edge 308e of the top portion 300 can provide added grip for the user. The teeth 306, 307 on the top portion 300 and the teeth 212 on the bottom portion 200, which are located to not overlap with each other, grind any materials 400 in the bowl. Therefore, the top portion 300 may be rotated freely about without the teeth 307, 306, 212 on the top portion 300 and bottom portion 200 binding, as best seen in FIG. 17. In an embodiment where the bottom portion 200' includes through holes 216', the ground material 400 can fall through the holes 216' into the container 100 below. A user can then remove the top portion 300 and extract any unneeded materials from the bowl 204 of the bottom portion 200.

As noted above, the bottom portion 200 of the grinder 101 can be disposed in the mouth 102 of the jar 100, and coupled with the aforementioned screw ring 120, without the top portion 300. In such an embodiment, the bottom portion 200 can function as an alternative lid of the jar 100. In yet a further alternative method of use, the grinder 101 can be used without a mason jar 100.

Unless otherwise specified, the method steps provided for in the present disclosure can be performed in any order.

Therefore, it can be seen that the grinder for a mason jar solves the problems of the prior art by providing a grinder with a top and bottom portions where the bottom portion may be captured to the threaded mouth of the mason jar with a common band, e.g. a band screw. The bottom portion forms a seal with the threaded mouth and forms a lid to the mason jar. The top portion may then be engaged with the bottom portion. A user may then twist the top portion in order to grind materials in the bowl with the teeth. The entire assembly may be stored conveniently together. The top and bottom portions may be provided to the consumer as a standalone retrofittable grinder to any existing mason jar or it may be provided with the mason jar as a complete storage and grinder combination device.

It would be appreciated by those skilled in the art that various changes and modifications can be made to the illustrated embodiments without departing from the spirit of the present disclosure. All such modifications and changes are intended to be within the scope of the present disclosure.

The invention claimed is:

1. A grinder system for grinding and storing material, the system comprising:
   a container having
      an opening extending from a top most edge, and
      the opening of the container has a thread disposed on an outer surface thereof;
   a grinder disposed in the opening of the container, the grinder including,
      a bottom portion having a rim and a cylindrical bowl, the cylindrical bowl having an outer wall and a bottom surface, wherein the rim of the bottom portion is disposed on the top most edge of the container and the bowl extends downward into the opening of the container; and
      a top portion having a disc and a cylindrical wall extending down from a bottom surface of the disc, wherein the cylindrical wall is disposed in the bowl of the bottom portion such that the wall is able to rotate relative the bowl; and
   a threaded band screw having an internal thread that is complementary to the thread disposed on the outer surface the opening of the container,
   wherein the threaded band screw is sized such that the threaded band screw can be threaded onto the opening of the container, and
   wherein a bottom surface of the rim of the bottom portion is in contact with the top most edge of the container and a top surface of the rim of the bottom portion is in contact with a bottom surface of the threaded band screw, when the threaded band screw is threaded onto the container.

2. The system of claim 1, wherein
   the bottom portion includes at least one ring of lower teeth extending upwardly from the bottom surface of the bowl, where the at least one ring of lower teeth are disposed along a first radius; and
   the top portion includes at least one ring of upper teeth extending downward from the bottom surface of the disc, where the at least one ring of upper teeth are disposed along a second radius,
   wherein the at least one ring of lower teeth and the at least one ring of upper teeth interface to grind a material.

3. The system of claim 2, wherein
   the at least one ring of lower teeth includes three rings of lower teeth,
   the at least one ring of upper teeth includes three rings of upper teeth,
   each of the three rings of lower teeth and the three rings of upper teeth being arranged along different radii.

4. The system of claim 2, further including a central guide post extending upward from the center of the bottom surface of the bowl.

5. The system of claim 4, wherein
   the central guide post includes a bottom magnet on a top portion thereof,
   the top portion includes a top magnet at the center of the disc of the top portion,
   wherein, the top magnet is magnetically attracted to the bottom magnet so that the top portion is retained to the bottom portion and configured to rotated relative thereto.

6. The system of claim 2, wherein at least one of the upper teeth and at least one of the lower teeth have a truncated diamond pyramidal shape.

7. The system of claim 2, further comprising a plurality of through holes disposed in the bottom of the cylindrical bowl to permit the material to fall into the container.

8. The system of claim 1,
   wherein the cylindrical wall has a first height and the bowl of the bottom portion has a second height, and
   wherein the first height is greater than the second height thereby defining a gap between the top surface of the rim and the bottom surface of the disc.

9. The system of claim 1, wherein an outer edge of the disc of the top portion is knurled.

10. The system of claim 1, wherein the bottom surface of the disc of the top portion is spaced from the threaded band screw and the bottom portion of the grinder.

11. The system of claim 1, wherein the container, the threaded band screw, the bottom portion, and the top portion are all co-axially aligned.

12. The system of claim 1, wherein the container is a mason jar.

* * * * *